United States Patent Office 3,440,680
Patented Apr. 29, 1969

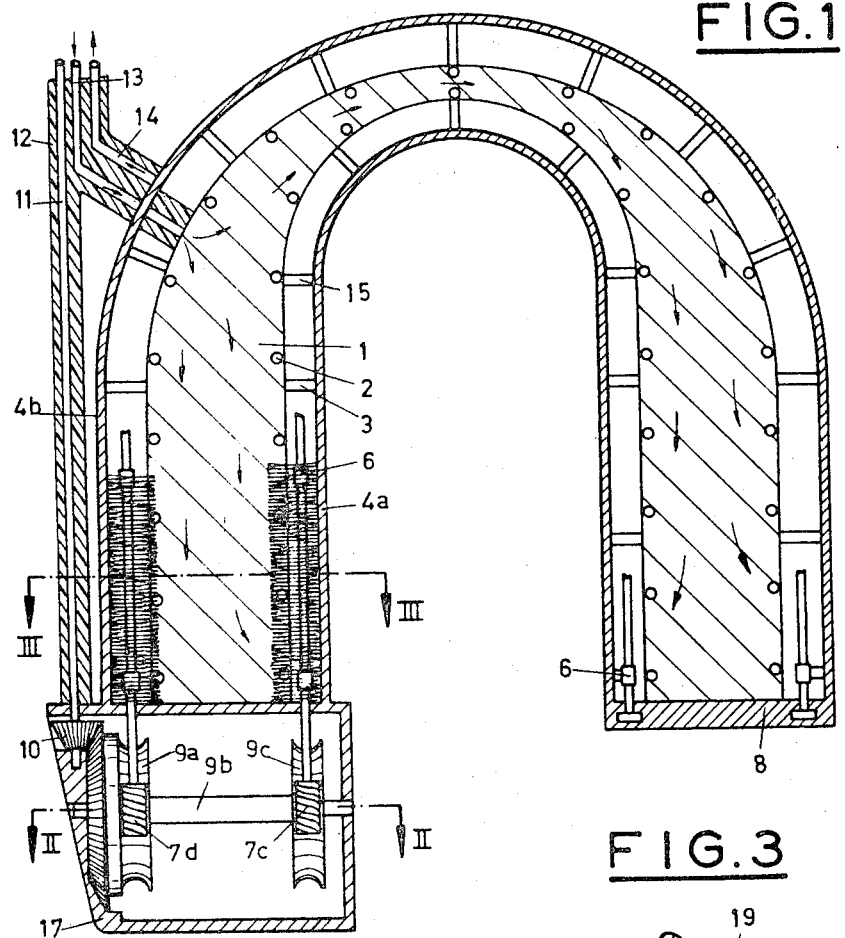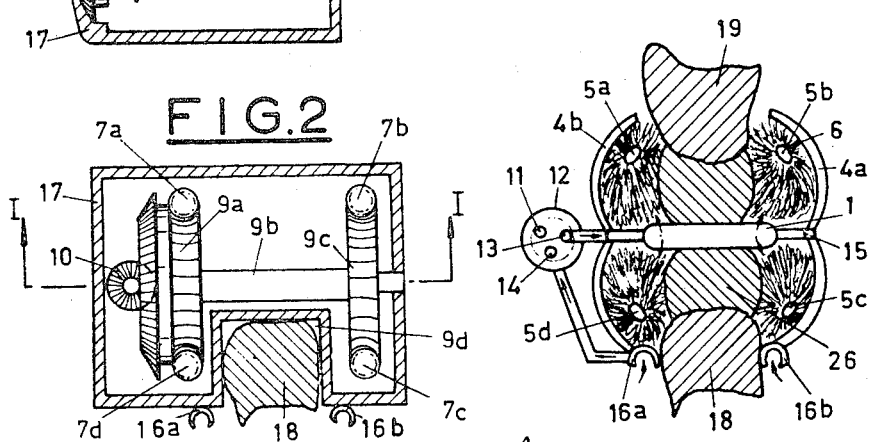

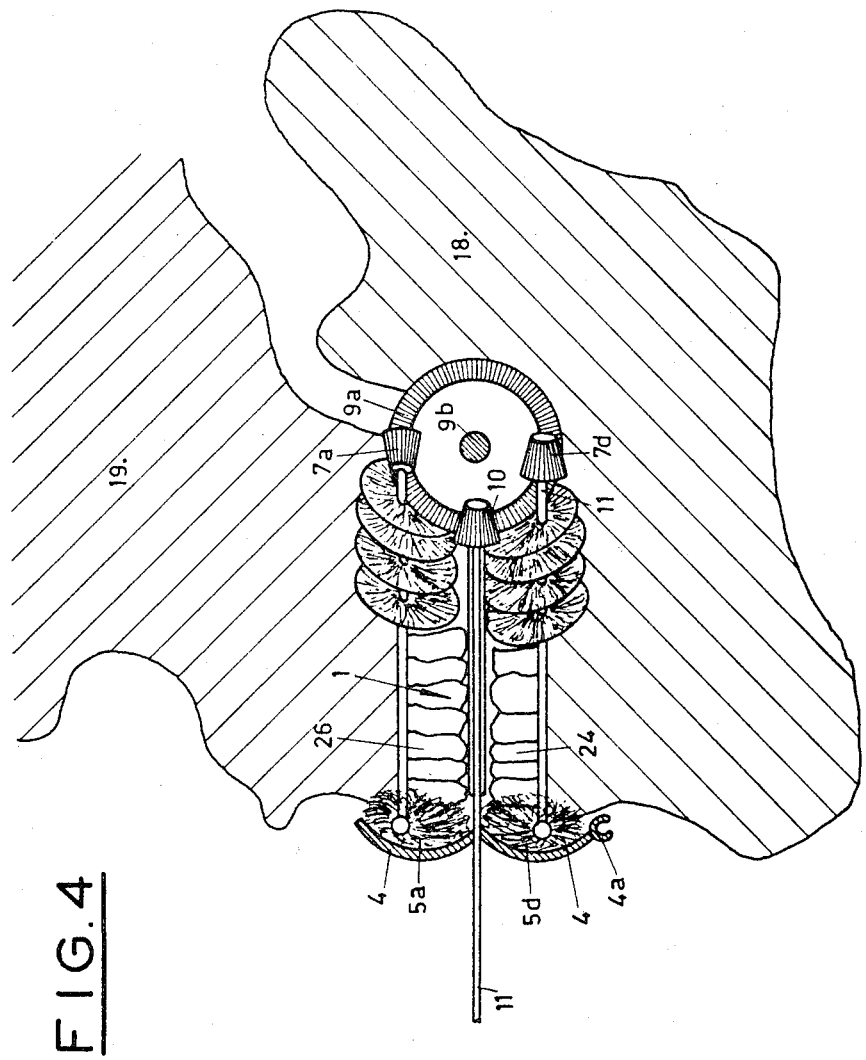

3,440,680
DENTAL CARE APPARATUS
Winfried Joseph Werding, La Grange,
1066 Epalinges, Switzerland
Filed Apr. 14, 1967, Ser. No. 630,896
Claims priority, application Switzerland, Apr. 19, 1966,
5,632/66
Int. Cl. A46b 13/04, 11/06
U.S. Cl. 15—321                                10 Claims

ABSTRACT OF THE DISCLOSURE

This invention has for its object a dental care apparatus characterised by the fact that it comprises a dental plate-shaped support corresponding to the shape of the maxillaries, carrying rotating brushes extending in anatomical conformation along the support on the side of the teeth and rotatively driven by an element of a gear works secured to one of its extremities and meshing with at least one toothed wheel driven by a pinion secured at the end of a transmission member rotatively driven by external driving means, the said support being such that it can be placed between the upper and lower maxillaries so that these be approximately closed one on the other.

---

The apparatus according to the invention permits the very effective brushing of the teeth and of the gums.

The accompanying drawing represents by way of example one embodiment of the invention.

FIGURE 1 shows an elevational view in cross-section taken along line I—I of FIGURE 2.

FIGURE 2 shows a vertical cross-sectional view taken along line II—II of FIGURE 1.

FIGURE 3 shows a vertical cross-sectional view taken along line III—III of FIGURE 1.

FIGURE 4 shows cross-sectionally the placing of the apparatus between the maxillaries.

Figure 5:
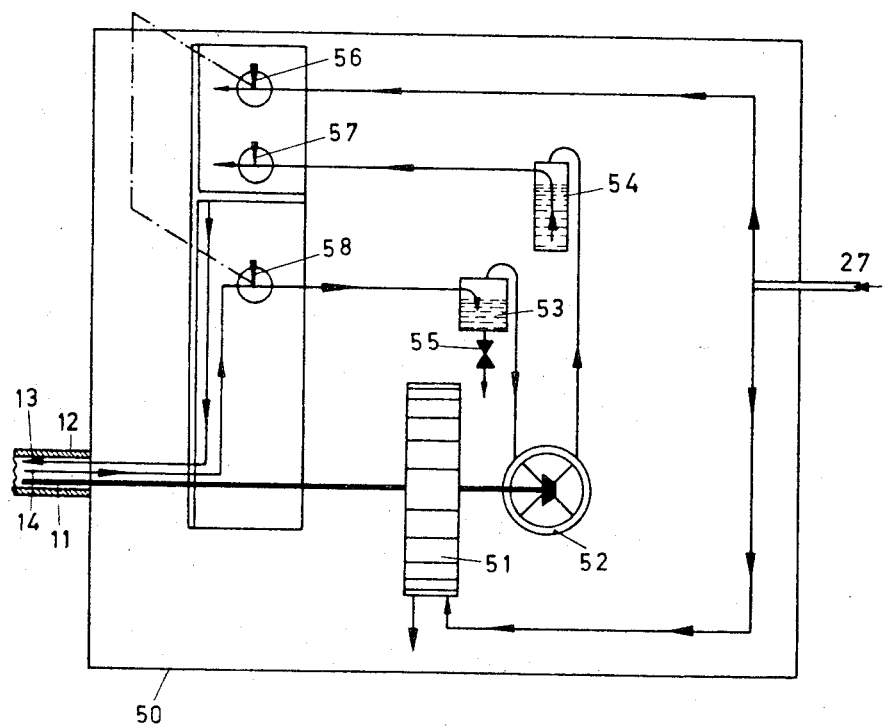
FIGURE 5 shows schematically the device for driving and feeding the apparatus.

The apparatus consists essentially of a support 1 which assumes the shape of a dental plate and constituted by a very flattened tube perforated on its upper and lower surfaces with holes 2. On support 1 are secured on either side thereof protection plates 4a and 4b welded to support 1 by the intermediary of cross pieces 15. These protective plates have each two inner concave surfaces, upper and lower, housing four brushes 5a, 5b, 5d and 5c the bristles of which are secured on a twisted cable supported along support 1 by fixed bearings distributed along the protective plates 4a and 4b.

Along the lower edge of the protection plates are additionally secured tubes 16a and 16b split longitudinally along their lower part and connected to a suction pipe 14. A pipe 13 is also connected to tube 1.

The bristles of brushes 5a, 5b, 5c and 5d are secured on the cable in such a way as to form a helical surface along the cable. The brushes are driven by endless screw elements 7a, 7b, 7c and 7d, the endless screws 7a and 7b meshing with a toothed wheel 9a while the endless screws 7b and 7c mesh with a second toothed wheel 9c, the two toothed wheels being mounted on a common shaft 9b, wheel 9a having a second conical external plate meshing with a conical pin 10 integral with the end of a flexible driving cable 11. This driving cable is lodged in a plastic sheath 12 uniting in a single cable driving cable 11, water inlet pipe 13 and outlet pipe 14.

The gear work composed of endless screws 7 and 10 and of wheels 9 is enclosed in a housing 17 the shape of which takes into account the characteristics of the lower and upper maxillaries. As shown in FIGURE 4, the lower maxillary 18 prevents the passage of a cable or of any other driving means by the continuous horizontal line after the last molar. On the contrary, the upper maxillary 19 goes up immediately after the last molar and almost vertically. Since rotating brush 5c, which is intended for brushing the gum of the lower maxillary on the lingual side, is located above the level of the continuous horizontal line of the lower maxillary, the shape of the gear work must be adapted to these particular circumstances. The use of two vertical toothed wheels 9a and 9c positioned on either side of endless screws 7a, 7b, 7c and 7d, makes it possible to give to housing 17 a cross-section having a cut-out 9d in which engages lower maxillary 18. Shaft 9b thus is positioned at the level of support 1 immediately above this cut. The diameter of wheels 9a and 9c are selected in proportion to the level of the rotating brushes.

Every other shape of gear work must take into account the particular shapes of the maxillaries and any other housing must have a cut similar to cut 9d if it is desired to drive a brush 5c.

Figure 6:
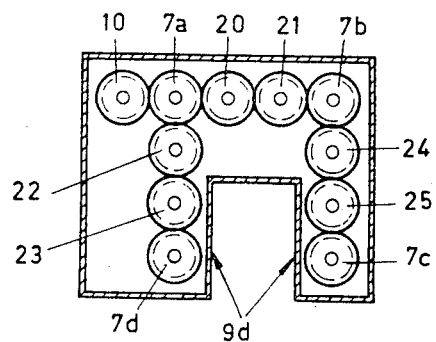
FIGURE 6 shows a modification of the driving device for the brushes.

FIGURE 6 shows a modification of the gear work fulfilling the above indicated requisites. There is seen driving pinion 10 while the endless screws are replaced by pinions 7a', 7d', 7c', and 7d' located at the top of a rectangle and driven by intermediate toothed small diameter wheels 20, 21, 22, 23, 24, 25 positioned on the side of the rectangle. With these six auxiliary wheels, it is possible to drive the brushes in the same direction as with gear work 1 shown on FIGURE 2.

As will be seen on FIGURES 3 and 4, the rotating brushes, owing to their helical shape, laterally brush the surface of teeth 26. They are furthermore rotationally driven in such a way that brushing always takes place from the gum to the extremity of the teeth.

The other end of the cables carrying the rotating brushes is retained in a support 8 in which it is able to freely turn.

Sheath 12 is connected to an installation comprising driving means, means for bringing liquid and for evacuating saliva and waste liquid (FIGURE 5).

This installation is connected by a conduit 27 to a water faucet which constitutes the driving energy source. The water drives turbine 51 the shaft of which drives transmission cable 11 and rotating pump 52 creating a suction in recipient 53 to which is connected the aspiration conduit 14 and causes excess pressure in a receiver 54 containing a cleaning liquid, for example a liquid dentifrice, the conduit 13 being connected to this recipient. Conduit 13 can also be directly connected to the water faucet by means of a valve 56 the control of which is coupled with that of a valve 58 placed on aspiration conduit 14. A third valve 57 is placed at the outlet of recipient 54.

During use, the apparatus is placed between the lower and upper maxillaries as shown on FIGURE 4. If dry brushing is desired, the three valves 56, 57 and 58 are closed. If on the contrary it is desired to clean or to treat by means of a suitable liquid contained in recipient 54, valve 57 is opened and the pump will drive liquid from recipient 54 into conduit 13 which will bring it into tube 1 from which it will be projected under pressure on brushes 5 by holes 2. After cleaning or treatment, it is usual to rinse. For this purpose, valve 57 is closed and valves 56 and 58 are simultaneously opened. Water from the tap arrives under its own pressure in the mouth through conduit 13, while pump 52 sucks through pipes 16a and 16b rinse water through conduit 14 and into recipient 53. Once the rinsing is achieved, recipient 53 can be drained through petcock 55.

Installation 50 as shown can be variously modified. Thus instead of a hydraulic turbine it is possible to drive it by means of an electric motor. The number of valves and of recipients can be increased, each recipient 54 containing a different liquid for the appropriate treatment.

The apparatus has been described under its most complete form, but it is evident that more simplified forms can be provided in order to lower its cost price. In a low cost modification, support 1 can be constituted of a plate and canals 13 and 14 eliminated, the feed in dentifrice and the rinsing taking place in the same manner as during brushing of the teeth with a conventional tooth brush.

What is claimed is:

1. Dental care apparatus comprising a dental plate shaped support adapted to espouse the shape of the maxillaries, rotating brushes extending anatomically along said support on the side of the teeth, a driving element for rotating said brushes secured at one extremity thereof, at least one toothed wheel positioned at one extremity of said support and meshing with said element, a transmission member having a pinion at one extremity thereof for driving said toothed wheel, external driving means rotatively driving said transmission member, said support being adapted for placing between the upper and lower maxillaries in such a way that said maxillaries be approximately closed on one another.

2. Apparatus according to claim 1, having four brushes positioned in pairs superimposed on either side of said support, endless screws secured at the extremity of said brushes, gears for rotating brushes of each pair in opposite directions, said gears being integral with a horizontal shaft, one of said wheels having a second external conical gear meshing with said pinion of said transmission member.

3. Apparatus according to claim 2, having a gear work lodged in a housing, said housing having in its lower face a reinforcing member extending near said shaft of said gears, said gears and said lower endless screws of said brushes being rotated on either side of this member, in such a way as to place said housing on the gum, behind the molars, and whereby the gum penetrates in said member in such a way that the lower brushes of each pair reach at least approximately the level of the neck of the teeth.

4. Apparatus according to claim 1, having four brushes positioned in two pairs superimposed on either side of said support, a plurality of small diameter toothed wheels positioned in series in the shape of an inverted U, with the toothed wheels integral with the lower brushes of each pair being disposed at the extremities of the branches of the U, whereby the apparatus can be placed on the gum behind the molars in such a way as the molars engage in said U, the lower toothed wheels then being on a level with the neck of the teeth.

5. Apparatus according to claim 1, wherein said support consists of a flat tube perforated with holes, and having a pipe connected thereto for bringing water or cleaning solution to said support.

6. Apparatus according to claim 1, having protective side plates secured on each side of said support, for protecting the brushes and carrying bearings for said brushes.

7. Apparatus according to claim 6, having perforated tubes secured along the lower part of said protective plates, and an external suction pipe connected to said tubes.

8. Apparatus according to claim 7, having driving means and a common sheath, connecting said support with said driving means, and having a flexible cable serving as transmission member placed with said pipe in said common sheath.

9. Apparatus according to claim 1, wherein said brush comprises a twisted cable, said cable holding bristles forming a helical surface.

10. Apparatus according to claim 1, comprising a first recipient having an inlet pipe, and a second recipient connected to a suction pipe, a pump for causing excess pressure in said first recipient, and a decrease in pressure in said second recipient, said driving means comprising a hydraulic turbine also driving said pump, said inlet pipe being connected to a water inlet, and having two twin valves for simultaneously opening the connection with said water inlet and said suction pipe.

References Cited

UNITED STATES PATENTS

| | | | |
|---|---|---|---|
| 2,628,377 | 2/1953 | Cockriel | 15—23 |
| 3,134,127 | 5/1964 | Klein | 401—13 X |

ROBERT W. MICHELL, *Primary Examiner.*

U.S. Cl. X.R.

15—24